S. B. Sexton.

Magazine Fire-Place Stove.

No. 1,242.

Reissued Dec. 3, 1861.

Witnesses;
Sam'l McCoy
Geo. Reffer

Inventor;
S B Sexton

UNITED STATES PATENT OFFICE.

S. B. SEXTON, OF BALTIMORE, MARYLAND.

IMPROVEMENT IN STOVES.

Specification forming part of Letters Patent No. 23,716, dated April 19, 1859; Reissue No. 1,242, dated December 3, 1861.

*To all whom it may concern:*

Be it known that I, S. B. SEXTON, of Baltimore, in the county of Baltimore and State of Maryland, have invented a new and useful Improvement in Stoves; and I do hereby declare that the following is a full, clear, and exact description of the same, reference being had to the accompanying drawings, making part of this specification, in which—

Figure 3:
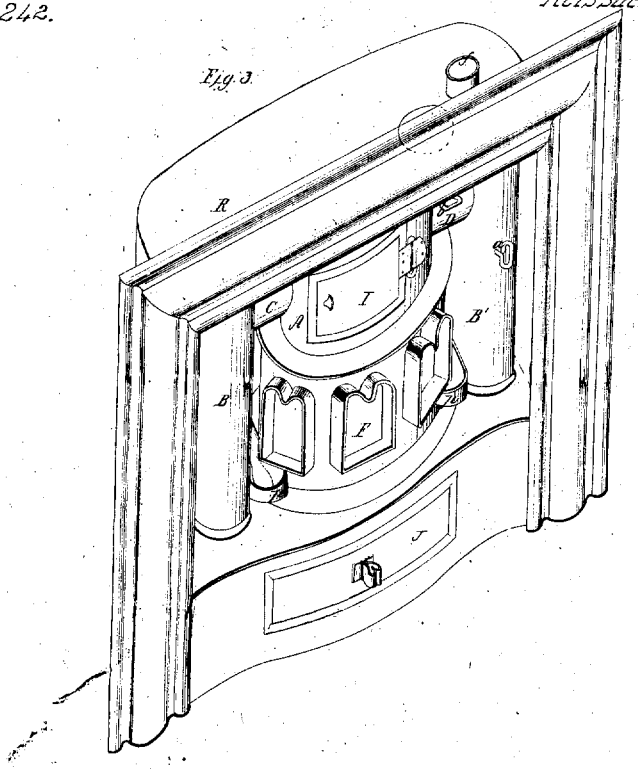
Figure 1:
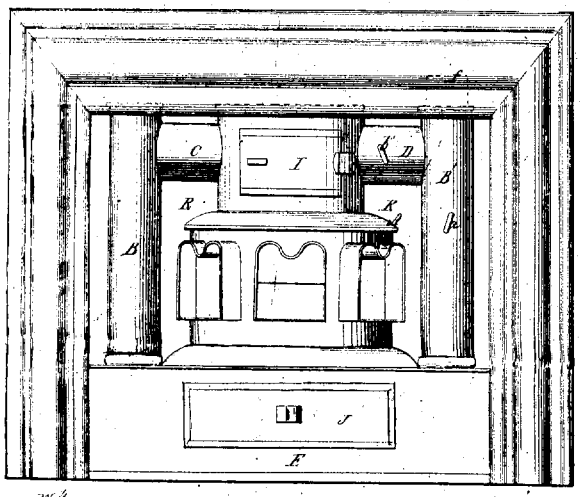
Figure 2:
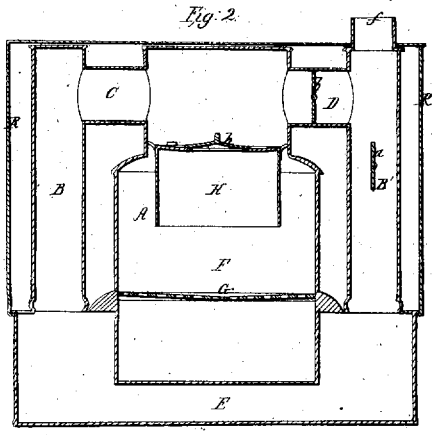

Figure 1 is a front elevation of a stove illustrating my invention. Fig. 2 is a vertical longitudinal section of the same. Fig. 3 is a perspective view of the same, exhibiting the location of the cold-air chamber hereinafter referred to.

Similar letters of reference indicate corresponding parts in the several figures.

The leading feature of novelty in this invention consists in the use of a fuel-supply chamber so supported within or above the fire-box that the points of attachment shall be out of contact with the burning fuel and the lower end of the supply-chamber out of contact with the walls of the stove, and a free circulation of the products of combustion be permitted around and above the supply-chamber.

The invention also consists in certain combinations of parts, producing increased radiating-surface and facilities for warming apartments above the location of the stove.

To enable others skilled in the art to make and use my invention, I will proceed to describe its construction and operation.

A is the central apartment of the stove containing the fire-chamber F and a fuel-chamber, H, of any suitable form, the latter being attached to the upper part or walls of the stove in such a manner as to allow a free circulation of air above, below, and around it. On each side of the central apartment is a chamber, B B′, connected with the upper portion of the apartment A by flues C and D, and communicating with each other beneath by a flue, E. In the chamber B′ is a damper, *a*, and in the flue D is a damper, 6. The exit-pipe *f* communicates with and ascends from the upper end of the chamber B′. Around the back portion of the aforesaid chambers is a casing, R, forming an air-chamber, in which heat from the three chambers A B B′ is imparted to a body of air, which is conveyed by a suitable flue into any upper apartments which it is desired to heat. *h* represents a cover, which may be applied to the fuel-chamber after the fire is kindled. G is the grate. I is a door through which fuel is introduced to the supply-chamber H. J is an ash-drawer of common construction. *p p* are evaporating-pans for water to supply moisture to the air.

The most advantageous manner of using this stove is as follows: To kindle the fire the damper 6, the door I, and the draft-door in the ash-drawer are opened, the cover *h* removed, and a plentiful supply of kindling placed on the grate G, beneath the chamber H. The kindling being ignited a moderate supply of coal is introduced and the door I closed. The draft being now directly upward through the chambers E and H and the flue D, the coal is in a short time thoroughly ignited. The door I is then again opened, the chamber H completely filled with coal, the cover *h* replaced, and the door I again shut. When this coal is sufficiently ignited, the damper 6 is closed. The fuel thus contained in the chambers F and H will support combustion for from twelve to twenty-four hours, and by additional supplies to the chamber H the fire may be kept up indefinitely. The coal within the supply-chamber H becomes heated ready for use, and any gases evolved thereby are carried downward through the chamber F and thoroughly consumed. The coal in the chamber F, being perfectly incandescent, evolves the greatest possible amount of heat and presents a brilliant and cheerful appearance through windows in the external walls. As it burns down it is constantly replenished at the center from the chamber H without any waste. The products of combustion ascend around the outside of the chamber H and pass through the flues C B E and B′ to the exit-flue *f*, the heat being regulated as occasion requires by means of the damper *d* and the draft in the ash-drawer. Cold air passes into the chamber R from the rear, and also from the front between the chambers A and B B′.

It will be evident that the cover of the fuel-supply chamber is not essential to my invention. Without it the suspended supply-chamber, though operating to much less advantage, will still be of great utility in holding the newly-inserted and partially-consumed coal, and causing the lower and outer chamber, E, to be occupied by a constantly-incandescent mass.

A great advantage in my invention consists in the absence of supports beneath the chamber H, which supports interfere with the proper motion of the fuel and obstruct the working and cleansing of the stove in various ways.

My improved stove, with the peculiar features of superiority above described, retains all the advantages of an analogous construction applied to single-cylinder stoves. It is also highly ornamental and possesses great heating power by reason of the most active combustion taking place in its exterior portion.

I do not restrict myself to any specific number of dampers or chambers or flues, nor to the particular location of the cold-air chamber; neither do I limit myself to the exact arrangement of the various parts so long as the effect and principle of operation be not essentially departed from; but,

Having thus described my invention, what I claim as new, and desire to secure by Letters Patent, is—

1. A fuel-supply chamber suspended within or above the fire-box by connections which shall be out of contact with the burning fuel and shall permit the free circulation of gases around and above the supply-chamber.

2. A cold-air chamber combined in any manner, substantially as herein described, with a fuel-supply chamber, H, so applied as to permit the passage of the products of combustion around and above it.

3. The combination of the main-chamber A, fuel-chamber H, flues C, B, E, B′, and D, and damper 6, arranged and operating substantially as hereinbefore explained.

S. B. SEXTON.

Witnesses:

SAML. McCOY,

JAMES B. HINDES.